(12) United States Patent
Scherer et al.

(10) Patent No.: US 10,150,928 B2
(45) Date of Patent: Dec. 11, 2018

(54) POLYESTER AND USE OF POLYESTER IN LUBRICANTS

(71) Applicant: BASF SE, Ludwigshafen (DE)

(72) Inventors: Markus Scherer, Mannheim (DE); Ronny Rinklieb, Düsseldorf (DE)

(73) Assignee: BASF SE (DE)

( * ) Notice: Subject to any disclaimer, the term of this patent is extended or adjusted under 35 U.S.C. 154(b) by 307 days.

(21) Appl. No.: 15/022,286

(22) PCT Filed: Sep. 3, 2014

(86) PCT No.: PCT/EP2014/068679
§ 371 (c)(1),
(2) Date: Mar. 16, 2016

(87) PCT Pub. No.: WO2015/036293
PCT Pub. Date: Mar. 19, 2015

(65) Prior Publication Data
US 2016/0281018 A1    Sep. 29, 2016

(30) Foreign Application Priority Data

Sep. 16, 2013 (EP) .................................... 13184559
Mar. 6, 2014 (EP) .................................... 14158001

(51) Int. Cl.
*C10M 107/32* (2006.01)
*C10M 145/22* (2006.01)
(Continued)

(52) U.S. Cl.
CPC .......... *C10M 107/32* (2013.01); *C08G 63/12* (2013.01); *C10M 129/82* (2013.01);
(Continued)

(58) Field of Classification Search
CPC .............. C10M 107/32; C10M 129/82; C10M 145/22; C10M 2209/1023;
(Continued)

(56) References Cited

U.S. PATENT DOCUMENTS 3,087,936 A    4/1963 Le Suer
3,172,892 A    3/1965 Le Suer et al.
(Continued)

FOREIGN PATENT DOCUMENTS

CN    103242516 A    8/2013
EP    321302 A2    6/1989
(Continued)

OTHER PUBLICATIONS

International Search Report for PCT/EP2014/068679 dated Dec. 15, 2014.

*Primary Examiner* — Taiwo Oladapo
(74) *Attorney, Agent, or Firm* — Drinker Biddle & Reath LLP (57) ABSTRACT

The presently claimed invention is directed to novel polyesters which are obtainable by reacting a mixture comprising at least one C8-C20 Guerbet alcohol, at least one aliphatic or cycloaliphatic dicarboxylic acid and at least one polyol with a hydroxyl functionality in the range of ≥2 to ≤6 and the use of these polyesters as a component of lubricating oil compositions.

17 Claims, 1 Drawing Sheet

(51) Int. Cl.
*C08G 63/12* (2006.01)
*C10M 129/82* (2006.01)

(52) U.S. Cl.
CPC .. *C10M 145/22* (2013.01); *C10M 2203/1006* (2013.01); *C10M 2203/1025* (2013.01); *C10M 2205/0285* (2013.01); *C10M 2205/223* (2013.01); *C10M 2207/2805* (2013.01); *C10M 2207/304* (2013.01); *C10M 2207/3045* (2013.01); *C10M 2209/102* (2013.01); *C10M 2209/1023* (2013.01); *C10M 2209/1033* (2013.01); *C10M 2223/0405* (2013.01); *C10M 2229/025* (2013.01); *C10N 2220/022* (2013.01); *C10N 2230/06* (2013.01); *C10N 2230/08* (2013.01); *C10N 2230/64* (2013.01); *C10N 2240/04* (2013.01); *C10N 2240/06* (2013.01); *C10N 2240/08* (2013.01); *C10N 2240/10* (2013.01); *C10N 2240/12* (2013.01); *C10N 2240/121* (2013.01); *C10N 2240/20* (2013.01); *C10N 2240/201* (2013.01); *C10N 2240/30* (2013.01); *C10N 2240/40* (2013.01); *C10N 2240/50* (2013.01); *C10N 2240/52* (2013.01); *C10N 2240/58* (2013.01); *C10N 2240/62* (2013.01); *C10N 2250/10* (2013.01)

(58) Field of Classification Search
CPC ...... C10M 2209/102; C10M 2229/025; C10M 2223/0405; C10M 2209/1033; C10M 2207/3045; C10M 2207/304; C10M 2207/2805; C10M 2205/223; C10M 2205/0285; C10M 2203/1025; C10M 2203/1006; C08G 63/12; C10N 2240/62; C10N 2230/08; C10N 2240/201; C10N 2240/20; C10N 2240/121; C10N 2240/12; C10N 2240/10; C10N 2240/08; C10N 2240/06; C10N 2240/04; C10N 2230/64; C10N 2220/022; C10N 2250/10; C10N 2240/58; C10N 2240/52; C10N 2240/50; C10N 2240/40; C10N 2240/30; C10N 2230/06

See application file for complete search history.

(56) References Cited

U.S. PATENT DOCUMENTS

| | | |
|---|---|---|
| 3,254,025 A | 5/1966 | Le Suer |
| 3,381,022 A | 4/1968 | Le Suer |
| 3,382,291 A | 5/1968 | Brennan |
| 3,742,082 A | 6/1973 | Brennan |
| 3,769,363 A | 10/1973 | Brennan |
| 3,876,720 A | 4/1975 | Heilman et al. |
| 4,053,491 A | 10/1977 | Koch et al. |
| 4,149,178 A | 4/1979 | Estes |
| 4,234,435 A | 11/1980 | Meinhardt et al. |
| 4,239,930 A | 12/1980 | Allphin et al. |
| 4,367,352 A | 1/1983 | Watts, Jr. et al. |
| 4,413,156 A | 11/1983 | Watts, Jr. et al. |
| 4,434,408 A | 2/1984 | Baba et al. |
| 4,910,355 A | 3/1990 | Shubkin et al. |
| 4,956,122 A | 9/1990 | Watts et al. |
| 5,068,487 A | 11/1991 | Theriot |
| 5,135,638 A | 8/1992 | Miller |
| 5,246,566 A | 9/1993 | Miller |
| 5,286,397 A | 2/1994 | Schmid et al. |
| 5,362,378 A | 11/1994 | Borghard et al. |
| 5,565,086 A | 10/1996 | Cody et al. |
| 7,038,005 B1 | 5/2006 | O'Lenick, Jr. |
| 8,921,289 B2 | 12/2014 | Scherer et al. |

FOREIGN PATENT DOCUMENTS

| | | | |
|---|---|---|---|
| EP | 321304 A2 | 6/1989 | |
| EP | 0335013 A1 | 10/1989 | |
| EP | 0489809 A1 | 6/1992 | |
| EP | 710710 A2 | 5/1996 | |
| GB | 928789 A * | 6/1963 | ............... C10M 3/00 |
| JP | 2517245 B2 * | 7/1996 | ............... C07C 69/34 |
| SU | 806695 A1 | 2/1981 | |
| WO | WO-9103531 A1 | 3/1991 | |
| WO | WO-2007/082639 A1 | 7/2007 | |
| WO | WO-2008/014315 A2 | 1/2008 | |

\* cited by examiner

POLYESTER AND USE OF POLYESTER IN LUBRICANTS

CROSS-REFERENCE TO RELATED APPLICATIONS

This application is a national stage application (under 35 U.S.C. § 371) of PCT/EP2014/068679, filed Sep. 3, 2014, which claims benefit of European Application Nos. 13184559.6, filed Sep. 16, 2013, and 14158001.9, filed Mar. 6, 2014, all of which are incorporated herein by reference in their entireties.

The presently claimed invention is directed to novel polyesters which are obtainable by reacting a mixture comprising at least one C8-C20 Guerbet alcohol, at least one aliphatic or cycloaliphatic dicarboxylic acid and at least one polyol with a hydroxyl functionality in the range of ≥2 to ≤6 and the use of these polyesters as a component of lubricating oil compositions.

Polyesters have found a wide field of application as a valuable component of lubricating oil compositions. For example, for the lubrication of turbine engines of jet-propelled aircraft, esters of dicarboxylic acids and alcohols with medium chain length or esters of various polyols with fatty acids with a medium chain length are used.

Such polyesters have also been used to an increased extent for other lubrication problems where the lubricating requirements are high, as for example, as mixing components in partly synthetic engine oils. The special suitability of these polyesters for the these purposes is based on the facts that, compared with conventional lubricants based on mineral oil, they have far more favorable behaviour of viscosity with temperature and that, compared with substances of comparable viscosities, the pour point is distinctly lower.

The properties also represent an essential requirement for the suitability of an oil as the operating fluid in hydraulic systems because its viscosity is only allowed to alter to an insignificant extent with considerable temperature variations. Besides it must also remain capable of use at low temperatures because modern vehicles are expected to operate satisfactorily at relatively low ambient temperatures, often without auxiliary heating equipment. At these cold temperatures, the lubricant plays a key role in determining how easily the vehicle can be started, and how quickly all vital moving parts are oiled. A lubricant which is too thick under these conditions may result in poor operability, or in some cases catastrophic equipment failure due to oil starvation.

It is common knowledge to the technician that ester oils of higher viscosity usually prove less satisfactory in their behaviour in the cold because the increase of the viscosity generally accompanies an increase of the pour points. For lubrications problems which absolutely necessitate the use of more highly viscous polyester, so-called complex polyester have been developed. These complex polyester contains as esterification components both diols or polyols and dicarboxylic acids in addition to monofunctional alcohols or acids in order to prepare polyester with low acid and hydroxyl number. The viscosities of such complex polyester lie at 38° C. at about 30 to 300 cSt and at 99° C. at 10 to 30 cSt. The pour points of such highly viscous complex polyester do not generally lie below −30° C. Thus, they are not satisfactory in this respect for many purposes of use.

EP 489 809 B1 describes the esterification product of aliphatic dicarboxylic acids having 8 or 9 carbon atoms and Guerbet alcohols having 12 to 20 carbon atoms and their use as a component of lubricating oil compositions.

U.S. Pat. No. 4,053,491 discloses esters of branched-chain aliphatic polyols with saturated, branched-chain, aliphatic monocarboxylic acids and their use as lubricants or hydraulic fluids.

WO 2007/082639 A1 describes the use of polyester which are obtainable by reacting a mixture comprising branched monofunctional alcohols and aliphatic dicarboxylic acids as lubricant.

U.S. Pat. No. 7,038,005 B1 is related to a series of polyesters based upon the reaction of succinic acid, dimer alcohol and Guerbet alcohol. The resulting polyester is a high molecular weight product that is tolerated by the skin and has outstanding emolliency.

EP 335 013 A1 provides a polyester that is based on dimeric fatty acid, a glycol without hydrogen atoms at an alpha carbon atom in which a C3-C12 monoalcohol chain-stopper is present.

At present, DIDA (diisodecyl adipate), DITA (diisotridecyl adipate) and TMTC (trimethylolpropanolcaprylat) are commonly used as a component of lubricating oil compositions. While these esters show are relatively high viscosity index and, thus, satisfactory overall temperature/viscosity behaviour, the pour points of these esters lie at −57° C., −55° C. and −54° C., respectively.

In view of the properties of existing polyesters there is still a need to provide novel polyesters that show improved low temperature properties as expressed by low pour points while maintaining an overall advantageous temperature/viscosity behaviour as expressed by a high viscosity index.

Thus, it was an object of the presently claimed invention to provide novel polyesters that show improved low temperature properties as expressed by low pour points, in particular pour points <−60° C., while maintaining an overall advantageous temperature/viscosity behaviour as expressed by a high viscosity index.

The object was solved by providing novel polyester that are prepared from a combination of branched monoalcohols and polyfunctional alcohols as starting compounds containing hydroxyl groups and aliphatic and cycloaliphatic dicarboxylic acids as starting compounds containing acidic groups.

Thus, in one embodiment the presently claimed invention is directed to a polyester which is obtainable by reacting a mixture comprising
a) at least one acid selected from the group consisting of aliphatic dicarboxylic acids having 5 to 20 carbon atoms and cycloaliphatic dicarboxylic acid having 4 to 36 carbon atoms,
b) at least one monoalcohol of general formula I, wherein p denotes 1, 2, 3, 4, 5, 6 or 7;
and
c) at least one polyol with a hydroxyl functionality in the range of ≥2 to ≤6.

Surprisingly, the inventively claimed polyester show improved low temperature properties as expressed by low pour points, in particular pour points <−60° C., while maintaining an overall advantageous temperature/viscosity behaviour as expressed by a high viscosity index. Moreover, the inventively claimed polyesters are highly hydrolytically stable and show improved thermal stability.

Preferably, the at least one aliphatic dicarboxylic acid having 5 to 20 carbon atoms is selected from the group consisting of glutaric acid, azelaic acid, sebacic acid, adipic acid, pimelic acid, suberic acid, undecanedioic acid, dodecanedioic acid, brassylic acid, tetradecanedioic acid, pentadecanedioic acid, hexadecanedioic acid and octadecanedioic acid.

Preferably, the at least one cycloaliphatic dicarboxylic acid having 4 to 36 carbon atoms is selected from the group consisting of 1,4-cyclohexanedicarboxylic acid, 2,6-decahydronaphthalenedicarboxylic acid, 1,3-cyclohexanedicarboxylic acid and 2,5-norbornanedicarboxylic acid.

"Aliphatic" means a straight- or branched-chain, saturated or unsaturated, preferably saturated, non-aromatic hydrocarbon moiety having the specified number of carbon atoms (e.g. having 5 to 20 carbon atoms, i.e. 5, 6, 7, 8, 9, 10, 11, 12, 13, 14, 15, 16, 17, 18, 19 or 20 carbon atoms). In the sense of the presently claimed invention, "aliphatic" moieties also include moieties wherein up to three, preferably 1 or 2, carbon atoms in the straight- or branched-chain have been replaced with a heteroatom independently selected from NH, O or S.

"Cycloaliphatic" means a saturated or unsaturated, preferably saturated, non-aromatic hydrocarbon moiety having the specified number of carbon atoms (e.g. having 4 to 36 carbon atoms, i.e. 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35 or 36 carbon atoms) and having 1 to 3 rings, each ring having from 3 to 8, preferably 3 to 6, carbon atoms.

The aliphatic dicarboxylic acid can also be used in the form of its anhydride.

More preferably, an aliphatic dicarboxylic acid having 5 to 10 carbon atoms is present as component a). Even more preferably, an aliphatic dicarboxylic acid having 5 to 8 carbon atoms is present as component a). Most preferably, adipic acid is present as component a).

Component b) is at least one monoalcohol of general formula I, wherein p denotes 1, 2, 3, 4, 5, 6 or 7.

The at least one monoalcohol of general formula I is 2-ethyl-1-hexanol (for p=1), 2-propyl-1-heptanol (for p=2), 2-butyl-1-octanol (for p=3), 2-pentyl-1-nonanol (for p=4), 2-hexyl-1-decanol (for p=5), 2-heptyl-1-undecanol (for p=6) and 2-octyl-1-dodecanol (for p=7).

Preferably p denotes 1, 2, 3, 4 or 5. More preferably p denotes 2.

The monoalcohol of general formula I is preferably present in the form of a mixture of different structural isomers. In particular, for p=2 a monoalcohol having 10 carbon atoms is obtained. The monoalcohol having 10 carbon atoms is preferably present as a mixture comprising
b1) a monoalcohol having 10 carbon atoms and a structure of the general formula II, wherein
$R_1$ is selected from the group consisting of pentyl, isopentyl, 2-methyl-butyl, 3-methyl-butyl and 2,2-dimethylpropyl,
$R_2$ is H or methyl,
$R_3$ is selected from the group consisting of ethyl, propyl and iso-propyl,
and
b2) a monoalcohol having 10 carbon atoms and a structure of the general formula III, wherein
$R_4$ is selected from the group consisting of pentyl, isopentyl, 2-methyl-butyl, 3-methyl-butyl and 2,2-dimethylpropyl,
$R_5$ is H or methyl,
$R_6$ is selected from the group consisting of ethyl, propyl and iso-propyl,
with the proviso that the monoalcohol b1) and the monoalcohol b2) have a different structure.

Preferably the monoalcohol b1) is selected from the group consisting of 2-propylheptanol, 2-propyl-4-methyl-hexanol, 2-propyl-5-methyl-hexanol, 2-isopropyl-4-methyl-hexanol, 2-isopropyl-5-methyl-hexanol, 2-propyl-4,4-dimethylpentanol, 2-ethyl-2,4-dimethylhexanol, 2-ethyl-2-methyl-heptanol, 2-ethyl-2,5-dimethylhexanol and 2-isopropyl-heptanol. More preferably the monoalcohol b1) is 2-propyl-heptanol.

Preferably the monoalcohol b2) is selected from the group consisting of 2-propylheptanol, 2-propyl-4-methyl-hexanol, 2-propyl-5-methyl-hexanol, 2-isopropyl-4-methyl-hexanol, 2-isopropyl-5-methyl-hexanol, 2-propyl-4,4-dimethylpentanol, 2-ethyl-2,4-dimethylhexanol, 2-ethyl-2-methyl-heptanol, 2-ethyl-2,5-dimethylhexanol and 2-isopropyl-heptanol. More preferably the monoalcohol b2) is 2-propyl-4-methyl-hexanol.

Preferably the weight ratio of monoalcohol b1) to monoalcohol b2) is in the range of 5:1 to 95:1, more preferably in the range of 6:1 to 50:1, even more preferably in the range of 10:1 to 40:1, most preferably in the range of 20:1 to 35:1.

Preferably the at least one polyol with a hydroxyl functionality in the range of ≥2 to ≤6 is selected from the group consisting of ethylene glycol, diethylene glycol, triethylene glycol, 1,2-propylene glycol, dipropylene glycol, tripropylene glycol, 1,4-butanediol, 1,6-hexanediol, bisphenol A, trimethylolpropane, glycerol, castor oil, pentaerythritol, sorbitol, dipentaerythritol and sucrose.

In case of a mixture of different polyols the number-average hydroxyl functionality is stated as the mixed hydroxyl functionality f$_n$(OH). The mixed hydroxyl functionality can be a non-integer number such as 2.2, 2.4 or 2.5.

More preferably the at least one polyol which is present as component c) has a hydroxyl functionality in the range of ≥3 to ≤6.

Preferably the inventively claimed polyester has a viscosity in the range from ≥10 to ≤500 mm²/s, more preferably in the range from ≥10 to ≤400 mm²/s, even more preferably in the range from ≥12 to ≤380 mm²/s, at 40° C. determined according to DIN 51562-1.

Preferably the inventively claimed polyester has a viscosity in the range from ≥3 to ≤50 mm²/s, more preferably in the range from ≥3 to ≤45 mm²/s, at 100° C. determined according to DIN 51562-1.

Preferably the polyester has a viscosity index in the range of ≥110 to ≤190, more preferably in the range of ≥110 to ≤180, even more preferably in the range of ≥110 to ≤170, even more preferably in the range of ≥130 to ≤170, determined according to ASTM D 2270.

Surprisingly, the inventively claimed polyester have a density that is <1.1 g/cm³, preferably <1.1 g/cm³. Preferably, the inventively claimed polyester have a density in the range from ≥0.91 to ≤0.99 g/cm³, more preferably in the range from ≥0.91 to ≤0.98 g/cm³, most preferably in the range from ≥0.92 to ≤0.97 g/cm³, at 15° C. determined according to DIN 51757.

Preferably, the inventively claimed polyester have an acid value in the range of ≥0.01 to ≤0.4 mg KOH/g, more preferably in the range of ≥0.05 to ≤0.4 mg KOH/g, even more preferably in the range of ≥0.05 to ≤0.3 mg KOH/g, determined according to DIN 51558.

Preferably, the inventively claimed polyester have a hydroxyl number in the range of ≥0.2 to ≤4.0 mg KOH/g, more preferably in the range of ≥0.2 to ≤3.0 mg KOH/g, even more preferably in the range of ≥0.2 to ≤2.8 mg KOH/g, determined according to DIN 53240.

Preferably, the mixture comprises
≥25 to ≤50% by weight of component a),
≥40 to ≤70% by weight of component b) and
≥0.1 to ≤20% by weight of component c),
whereby and the sum of the weight of all components a), b) and c) adds up to 100%.

Preferably, the mixture comprises
≥25 to ≤50% by weight of component a),
≥40 to ≤70% by weight of component b) and
≥0.5 to ≤15% by weight of component c),
whereby and the sum of the weight of all components a), b) and c) adds up to 100%.

More preferably, the mixture comprises
≥29 to ≤45% by weight of component a),
≥40 to ≤70% by weight of component b) and
≥0.8 to ≤14% by weight of component c),
whereby and the sum of the weight of all components a), b) and c) adds up to 100%.

In a preferred embodiment, the presently claimed invention is directed to a polyester which is obtainable by reacting a mixture comprising
a1) at least one aliphatic dicarboxylic acid having 5 to 10 carbon atoms,
b1) at least one monoalcohol of general formula I, $$H_3C-(CH_2)_p-\overset{H}{\underset{H_3C-(CH_2)_{(p+2)}}{C}}-CH_2-O-H,\qquad I$$

wherein p denotes 1, 2, 3, 4, 5, 6 or 7;
and
c1) at least one polyol with a hydroxyl functionality in the range of ≥2 to ≤6.

In a preferred embodiment, the presently claimed invention is directed to a polyester which is obtainable by reacting a mixture comprising
a1) at least one aliphatic dicarboxylic acid having 5 to 8 carbon atoms,
b1) at least one monoalcohol of general formula I, $$H_3C-(CH_2)_p-\overset{H}{\underset{H_3C-(CH_2)_{(p+2)}}{C}}-CH_2-O-H,\qquad I$$

wherein p denotes 1, 2, 3, 4, 5, 6 or 7;
and
c1) at least one polyol with a hydroxyl functionality in the range of ≥2 to ≤6.

In another preferred embodiment, the presently claimed invention is directed to a polyester which is obtainable by reacting a mixture comprising
a1) adipic acid,
b1) at least one monoalcohol of general formula I, $$H_3C-(CH_2)_p-\overset{H}{\underset{H_3C-(CH_2)_{(p+2)}}{C}}-CH_2-O-H,\qquad I$$

wherein p denotes 1, 2, 3, 4, 5, 6 or 7;
and
c1) at least one polyol with a hydroxyl functionality in the range of ≥2 to ≤6.

Preferably, the mixture comprises
≥25 to ≤50% by weight of component a1),
≥40 to ≤70% by weight of component b1) and
≥0.5 to ≤15% by weight of component c1),
whereby and the sum of the weight of all components a1), b1) and c1) adds up to 100%.

More preferably, the mixture comprises
≥29 to ≤45% by weight of component a1),
≥40 to ≤70% by weight of component b1) and
≥0.8 to ≤14% by weight of component c1),
whereby and the sum of the weight of all components a1), b1) and c1) adds up to 100%.

In another preferred embodiment, the presently claimed invention is directed to a polyester which is obtainable by reacting a mixture comprising
a2) at least one acid selected from the group consisting of aliphatic dicarboxylic acids having 5 to 20 carbon atoms and cycloaliphatic dicarboxylic acid having 4 to 36 carbon atoms,
b2) 2-propylheptanol
and
c2) at least one polyol with a hydroxyl functionality in the range of ≥2 to ≤6.

In another preferred embodiment, the presently claimed invention is directed to a polyester which is obtainable by reacting a mixture comprising
a2) at least one aliphatic dicarboxylic acid having 5 to 10 carbon atoms,
b2) 2-propylheptanol and
c2) at least one polyol with a hydroxyl functionality in the range of ≥2 to ≤6.
Preferably, the mixture comprises
≥25 to ≤50% by weight of component a2),
≥40 to ≤70% by weight of component b2) and
≥0.5 to ≤15% by weight of component c2),
whereby and the sum of the weight of all components a2), b2) and c2) adds up to 100%.
More preferably, the mixture comprises
≥29 to ≤45% by weight of component a2),
≥40 to ≤70% by weight of component b2) and
≥0.8 to ≤14% by weight of component c2),
whereby and the sum of the weight of all components a2), b2) and c2) adds up to 100%.
In a more preferred embodiment, the presently claimed invention is directed to a polyester which is obtainable by reacting a mixture comprising
a3) adipic acid,
b3) 2-propylheptanol and
c3) at least one polyol with a hydroxyl functionality in the range of ≥2 to ≤6.
Preferably, the mixture comprises
≥25 to ≤50% by weight of component a3),
≥40 to ≤70% by weight of component b3) and
≥0.5 to ≤15% by weight of component c3),
whereby and the sum of the weight of all components a3), b3) and c3) adds up to 100%.
More preferably, the mixture comprises
≥29 to ≤45% by weight of component a3),
≥40 to ≤70% by weight of component b3) and
≥0.8 to ≤14% by weight of component c3),
whereby and the sum of the weight of all components a3), b3) and c3) adds up to 100%.
In a preferred embodiment, the presently claimed invention is directed to a polyester which is obtainable by reacting a mixture comprising
a4) at least one acid selected from the group consisting of aliphatic dicarboxylic acids having 5 to 20 carbon atoms and cycloaliphatic dicarboxylic acid having 4 to 36 carbon atoms,
b4) at least one monoalcohol of general formula I, wherein p denotes 1, 2, 3, 4, 5, 6 or 7;
and
c4) trimethylolpropane.
In a preferred embodiment, the presently claimed invention is directed to a polyester which is obtainable by reacting a mixture comprising
a4) at least one aliphatic dicarboxylic acid having 5 to 10 carbon atoms,
b4) at least one monoalcohol of general formula I, wherein p denotes 1, 2, 3, 4, 5, 6 or 7;
and
c4) trimethylolpropane.
Preferably, the mixture comprises
≥25 to ≤50% by weight of component a4),
≥40 to ≤70% by weight of component b4) and
≥3 to ≤15% by weight of component c4),
whereby and the sum of the weight of all components a4), b4) and c4) adds up to 100%.
More preferably, the mixture comprises
≥29 to ≤45% by weight of component a4),
≥42 to ≤68% by weight of component b4) and
≥4 to ≤14% by weight of component c4),
whereby and the sum of the weight of all components a4), b4) and c4) adds up to 100%.
In another preferred embodiment, the presently claimed invention is directed to a polyester which is obtainable by reacting a mixture comprising
a5) at least one acid selected from the group consisting of aliphatic dicarboxylic acids having 5 to 20 carbon atoms and cycloaliphatic dicarboxylic acid having 4 to 36 carbon atoms,
b5) at least one monoalcohol of general formula I, wherein p denotes 1, 2, 3, 4, 5, 6 or 7;
and
c5) dipentaerythritol.
In another preferred embodiment, the presently claimed invention is directed to a polyester which is obtainable by reacting a mixture comprising
a5) at least one aliphatic dicarboxylic acid having 5 to 10 carbon atoms,
b5) at least one monoalcohol of general formula I, wherein p denotes 1, 2, 3, 4, 5, 6 or 7;
and
c5) dipentaerythritol.
Preferably, the mixture comprises
≥25 to ≤40% by weight of component a5),
≥50 to ≤70% by weight of component b5) and
≥0.5 to ≤7% by weight of component c5),
whereby and the sum of the weight of all components a5), b5) and c5) adds up to 100%.
More preferably, the mixture comprises
≥25 to ≤40% by weight of component a5),
≥60 to ≤70% by weight of component b5) and
≥0.5 to ≤5% by weight of component c5),
whereby and the sum of the weight of all components a5), b5) and c5) adds up to 100%.
In a more preferred embodiment, the presently claimed invention is directed to a polyester which is obtainable by reacting a mixture comprising
a6) adipic acid,
b6) at least one monoalcohol of general formula I, wherein p denotes 1, 2, 3, 4, 5, 6 or 7; and
c6) trimethylolpropane.

Preferably, the mixture comprises
≥25 to ≤50% by weight of component a6),
≥40 to ≤70% by weight of component b6) and
≥3 to ≤15% by weight of component c6),
whereby and the sum of the weight of all components a6), b6) and c6) adds up to 100%.

More preferably, the mixture comprises
≥29 to ≤45% by weight of component a6),
≥42 to ≤68% by weight of component b6) and
≥4 to ≤14% by weight of component c6),
whereby and the sum of the weight of all components a6), b6) and c6) adds up to 100%.

In another more preferred embodiment, the presently claimed invention is directed to a polyester which is obtainable by reacting a mixture comprising
a7) adipic acid,
b7) at least one monoalcohol of general formula I, wherein p denotes 1, 2, 3, 4, 5, 6 or 7; and
c7) dipentaerythritol.

Preferably, the mixture comprises
≥25 to ≤40% by weight of component a7),
≥50 to ≤70% by weight of component b7) and
≥0.5 to ≤7% by weight of component c7),
whereby and the sum of the weight of all components a7), b7) and c7) adds up to 100%.

More preferably, the mixture comprises
≥25 to ≤40% by weight of component a7),
≥60 to ≤70% by weight of component b7) and
≥0.5 to ≤5% by weight of component c7),
whereby and the sum of the weight of all components a7), b7) and c7) adds up to 100%.

In a most preferred embodiment, the presently claimed invention is directed to a polyester which is obtainable by reacting a mixture comprising
a8) adipic acid,
b8) 2-propylheptanol and
c8) trimethylolpropane.

Preferably, the mixture comprises
≥25 to ≤50% by weight of component a8),
≥40 to ≤70% by weight of component b8) and
≥3 to ≤15% by weight of component c8),
whereby and the sum of the weight of all components a8), b8) and c8) adds up to 100%.

More preferably, the mixture comprises
≥29 to ≤45% by weight of component a8),
≥42 to ≤68% by weight of component b8) and
≥4 to ≤14% by weight of component c8),
whereby and the sum of the weight of all components a8), b8) and c8) adds up to 100%.

In another most preferred embodiment, the presently claimed invention is directed to a polyester which is obtainable by reacting a mixture comprising
a9) adipic acid,
b9) 2-propylheptanol and
c9) dipentaerythritol.

Preferably, the mixture comprises
≥25 to ≤40% by weight of component a9),
≥50 to ≤70% by weight of component b9) and
≥0.5 to ≤7% by weight of component c9),
whereby and the sum of the weight of all components a9), b9) and c9) adds up to 100%.

More preferably, the mixture comprises
≥25 to ≤40% by weight of component a9),
≥60 to ≤70% by weight of component b9) and
≥0.5 to ≤5% by weight of component c9),
whereby and the sum of the weight of all components a9), b9) and c9) adds up to 100%.

In another aspect the presently claimed invention is directed to a process for the preparation of a polyester as defined above comprising the steps of
i) reacting a mixture comprising component a), component b) and component c), in each case as defined above, in the presence of at least one catalyst selected from the group consisting of titanium-containing compounds, zirconium-containing compounds and tin-containing compounds,
ii) heating the mixture obtained according to step i) to a temperature in the range of 80° C. to 160° C. in a first step and to a temperature in the range of 190° C. to 240° C. in a second step,
iii) applying vacuum to the reaction mixture obtained according to step ii),
iv) cooling of the reaction mixture obtained according to step iii) to a temperature in the range of 20° C. to 90° C. and adding water to the reaction mixture and
v) drying and purification of the reaction mixture obtained according to step iv).

The reaction between acid a) and alcohols b) and c) can be carried out using stoichiometric amounts of alcohols b) and c) and acid a), particularly when entrainers are used. However, preference is given to using a stoichiometric excess of the alcohols b) and c) of from 0.05 to 1.0 mole per mole of acid a) in order to achieve a complete conversion of the acid a).

In another embodiment, the presently claimed invention is directed to a lubricating oil composition comprising
a) ≥1% to ≤99.9% by weight of at least one polyester as defined above,
b) ≥0% to ≤99% by weight of at least one base stock selected from the group consisting of mineral oils (Group I, II or III oils), polyalphaolefins (Group IV oils), polymerized and interpolymerized olefins, alkyl naphthalenes, alkylene oxide polymers, silicone oils, phosphate esters and carboxylic acid esters (Group V oils),
and
c) ≥0.1 to ≤25% by weight of one or more performance additives,
whereby the % by weight of the components a), b) and c) is in each case related to the overall weight of the lubricating oil composition and the sum of the weight of all components a), b) and c) adds up to 100%.

In the specification and appended claims, the term "lubricating oil composition" refers to the combination of at least one inventively claimed polyester, optionally at least one additional base stock and performance additives such as dispersants, metal deactivators, detergents, viscosity modifiers, extreme pressure agents (typically boron- and/or sulfur- and/or phosphorus-containing), antiwear agents, antioxidants (such as hindered phenols, aminic antioxidants or molybdenum compounds), corrosion inhibitors, foam inhibitors, demulsifiers, pour point depressants, seal swelling agents and friction modifiers.

The percentages of components are given by weight, in each case based on the total amount of the performance additives, the inventively claimed polyesters and optionally the base stocks, i.e. the overall weight of the lubricating oil composition. If not specifically stated, the base stock makes up the balance of the lubricating oil composition.

A lubricating oil composition comprises the inventively claimed polyesters, optionally further base stocks and a variety of different performance additives in varying ratios.

Preferably the lubricating oil composition further comprises base stocks selected from the group consisting of mineral oils (Group I, II or III oils), polyalphaolefins (Group IV oils), polymerized and interpolymerized olefins, alkyl naphthalenes, alkylene oxide polymers, silicone oils, phosphate esters and carboxylic acid esters (Group V oils). Preferably the lubricating oil comprises ≥50% to ≤99% by weight or ≥80% to ≤99% by weight or ≥90% to ≤99% by weight base stocks, related to the total amount of the lubricating oil composition.

Definitions for the base stocks in this invention are the same as those found in the American Petroleum Institute (API) publication "Engine Oil Licensing and Certification System", Industry Services Department, Fourteenth Edition, December 1996, Addendum 1, December 1998. Said publication categorizes base stocks as follows:
a) Group I base stocks contain less than 90 percent saturates and/or greater than 0.03 percent sulfur and have a viscosity index greater than or equal to 80 and less than 120 using the test methods specified in the following table
b) Group II base stocks contain greater than or equal to 90 percent saturates and less than or equal to 0.03 percent sulfur and have a viscosity index greater than or equal to 80 and less than 120 using the test methods specified in the following table
c) Group III base stocks contain greater than or equal to 90 percent saturates and less than or equal to 0.03 percent sulfur and have a viscosity index greater than or equal to 120 using the test methods specified in the following table
Analytical Methods for Base Stock

| Property | Test Method |
|---|---|
| Saturates | ASTM D 2007 |
| Viscosity Index | ASTM D 2270 |
| Sulfur | ASTM D 2622 |
| | ASTM D 4294 |
| | ASTM D 4927 |
| | ASTM D 3120 |

Group IV base stocks contain polyalphaolefins. Synthetic lower viscosity fluids suitable for the present invention include the polyalphaolefins (PAOs) and the synthetic oils from the hydrocracking or hydroisomerization of Fischer Tropsch high boiling fractions including waxes. These are both stocks comprised of saturates with low impurity levels consistent with their synthetic origin. The hydroisomerized Fischer Tropsch waxes are highly suitable base stocks, comprising saturated components of iso-paraffinic character (resulting from the isomerization of the predominantly n-paraffins of the Fischer Tropsch waxes) which give a good blend of high viscosity index and low pour point. Processes for the hydroisomerization of Fischer Tropsch waxes are described in U.S. Pat. Nos. 5,362,378; 5,565,086; 5,246,566 and 5,135,638, as well in EP 710710, EP 321302 and EP 321304.

Polyalphaolefins suitable for the present invention, as either lower viscosity or high viscosity fluids depending on their specific properties, include known PAO materials which typically comprise relatively low molecular weight hydrogenated polymers or oligomers of alphaolefins which include but are not limited to $C_2$ to about $C_{32}$ alphaolefins with the $C_8$ to about $C_{16}$ alphaolefins, such as 1-octene, 1-decene, 1-dodecene and the like being preferred. The preferred polyalphaolefins are poly-1-octene, poly-1-decene, and poly-1-dodecene, although the dimers of higher olefins in the range of $C_{14}$ to $C_{18}$ provide low viscosity base stocks.

Low viscosity PAO fluids suitable for the present invention, may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters such as ethyl acetate or ethyl propionate. For example, the methods disclosed by U.S. Pat. No. 4,149,178 or 3,382,291 may be conveniently used herein. Other descriptions of PAO synthesis are found in the following U.S. Pat. No. 3,742,082 (Brennan); U.S. Pat. No. 3,769,363 (Brennan); U.S. Pat. No. 3,876,720 (Heilman); U.S. Pat. No. 4,239,930 (Allphin); U.S. Pat. No. 4,367,352 (Watts); U.S. Pat. No. 4,413,156 (Watts); U.S. Pat. No. 4,434,408 (Larkin); U.S. Pat. No. 4,910,355 (Shubkin); U.S. Pat. No. 4,956,122 (Watts); and U.S. Pat. No. 5,068,487 (Theriot).

Group V base stocks contain any base stocks not described by Groups I to IV. Examples of Group V base stocks include alkyl naphthalenes, alkylene oxide polymers, silicone oils, phosphate esters and carboxylic acid esters.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof.

Further carboxylic acid esters suitable for the present invention include the esters of mono and polybasic acids with monoalkanols (simple esters) or with mixtures of mono and polyalkanols (complex esters), and the polyol esters of monocarboxylic acids (simple esters), or mixtures of mono and polycarboxylic acids (complex esters). Esters of the mono/polybasic type include, for example, the esters of monocarboxylic acids such as heptanoic acid, and dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, or mixtures thereof with polyalkanols, etc. Specific examples of these types of esters include nonyl heptanoate, dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, dibutyl-TMP-adipate, diisodecyl adipate, di-propyladipate, di-isotridecyl adipate, trimethylpropyl tricaprylate, di-isooctyl adipate, di-ethylhexyl adipate and di-nonyl adipate.

Also suitable for the present invention are esters, such as those obtained by reacting one or more polyhydric alcohols, preferably the hindered polyols such as the neopentyl polyols, e.g. neopentyl glycol, trimethylol ethane, 2-methyl-2-propyl-1,3-propanediol, trimethylol propane, trimethylol butane, pentaerythritol and dipentaerythritol with monocarboxylic acids containing at least 4 carbons, normally the $C_5$ to $C_{30}$ acids such as saturated straight chain fatty acids including caprylic acid, capric acid, lauric acid, myristic acid, palmitic acid, stearic acid, arachic acid, and behenic acid, or the corresponding branched chain fatty acids or unsaturated fatty acids such as oleic acid, or mixtures thereof, with polycarboxylic acids.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, and the alkyl and aryl ethers of polyoxyalkylene polymers (e.g., methyl-polyiso-propylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$-$C_8$ fatty acid esters and $C_{13}$ Oxo acid diester of tetraethylene glycol.

Silicon-based oils such as the polyalkyl-, polyaryl-, polyalkoxy- or polyaryloxysilicone oils and silicate oils comprise another useful class of synthetic lubricants; such oils include tetraethyl silicate, tetraisopropyl silicate, tetra-(2-ethylhexyl)silicate, tetra-(4-methyl-2-ethylhexyl)silicate, tetra-(p-tert-butyl-phenyl) silicate, hexa-(4-methyl-2-ethylhexyl)disiloxane, oly(methyl)siloxanes and poly(methylphenyl)siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

The lubricating oil composition of the invention optionally further includes at least one other performance additive. The other performance additives include dispersants, metal deactivators, detergents, viscosity modifiers, extreme pressure agents (typically boron- and/or sulfur- and/or phosphorus-containing), antiwear agents, antioxidants (such as hindered phenols, aminic antioxidants or molybdenum compounds), corrosion inhibitors, foam inhibitors, demulsifiers, pour point depressants, seal swelling agents, friction modifiers and mixtures thereof.

The total combined amount of the other performance additives (excluding the viscosity modifiers) present on an oil free basis may include ranges of ≥0% by weight to ≤25% by weight, or ≥0.01% by weight to ≤20% by weight, or ≥0.1% by weight to ≤15% by weight or ≥0.5% by weight to ≤10% by weight, or ≥1 to ≤5% by weight of the composition.

Although one or more of the other performance additives may be present, it is common for the other performance additives to be present in different amounts relative to each other.

In one embodiment the lubricating oil composition further includes one or more viscosity modifiers.

Viscosity modifiers include (a) polymethacrylates, (b) esterified copolymers of (II) a vinyl aromatic monomer and (ii) an unsaturated carboxylic acid, anhydride, or derivatives thereof, (c) esterified interpolymers of (II) an alpha-olefin; and (ii) an unsaturated carboxylic acid, anhydride, or derivatives thereof, or (d) hydrogenated copolymers of styrene-butadiene, (e) ethylene-propylene copolymers, (f) polyisobutenes, (g) hydrogenated styrene-isoprene polymers, (h) hydrogenated isoprene polymers, or (II) mixtures thereof.

In one embodiment the viscosity modifier includes (a) a polymethacrylate, (b) an esterified copolymer of (II) a vinyl aromatic monomer; and (ii) an unsaturated carboxylic acid, anhydride, or derivatives thereof, (c) an esterified interpolymer of (II) an alpha-olefin; and (ii) an unsaturated carboxylic acid, anhydride, or derivatives thereof, or (d) mixtures thereof.

Viscosity modifier are preferably present in the lubricating oil composition in an amount of 0.01 to 8.0% by weight, more preferably in an amount of 0.01 to 4.0% by weight.

Extreme pressure agents include compounds containing boron and/or sulfur and/or phosphorus.

The extreme pressure agent may be present in the lubricating oil composition at 0% by weight to 20% by weight, or 0.05% by weight to 10% by weight, or 0.1% by weight to 8% by weight of the lubricating oil composition.

In one embodiment the extreme pressure agent is a sulfur-containing compound. In one embodiment the sulfur-containing compound may be a sulfurised olefin, a polysulfide, or mixtures thereof. Examples of the sulfurised olefin include a sulfurised olefin derived from propylene, isobutylene, pentene; an organic sulfide and/or polysulfide including benzyldisulfide; bis(chlorobenzyl) disulfide; dibutyl tetrasulfide; di-tertiary butyl polysulfide; and sulfurised methyl ester of oleic acid, a sulfurised alkylphenol, a sulfurised dipentene, a sulfurised terpene, a sulfurised Diels-Alder adduct, an alkyl sulphenyl N'N-dialkyl dithiocarbamates; or mixtures thereof.

In one embodiment the sulfurised olefin includes a sulfurised olefin derived from propylene, isobutylene, pentene or mixtures thereof.

In one embodiment the extreme pressure agent sulfur-containing compound includes a dimercaptothiadiazole or derivative, or mixtures thereof. Examples of the dimercaptothiadiazole include compounds such as 2,5-dimercapto-1,3,4-thiadiazole or a hydrocarbyl-substituted 2,5-dimercapto-1,3,4-thiadiazole, or oligomers thereof. The oligomers of hydrocarbyl-substituted 2,5-dimercapto-1,3,4-thiadiazole typically form by forming a sulfur-sulfur bond between 2,5-dimercapto-1,3,4-thiadiazole units to form derivatives or oligomers of two or more of said thiadiazole units. Suitable 2,5-dimercapto-1,3,4-thiadiazole derived compounds include for example 2,5-bis(tert-nonyldithio)-1,3,4-thiadiazole or 2-tert-nonyldithio-5-mercapto-1,3,4-thiadiazole. The number of carbon atoms on the hydrocarbyl substituents of the hydrocarbyl-substituted 2,5-dimercapto-1,3,4-thiadiazole typically include 1 to 30, or 2 to 20, or 3 to 16.

In one embodiment the dimercaptothiadiazole may be a thiadiazole-functionalised dispersant. A detailed description of the thiadiazole-functionalised dispersant is described is paragraphs [0028] to [0052] of International Publication WO 2008/014315.

The thiadiazole-functionalised dispersant may be prepared by a method including heating, reacting or complexing a thiadiazole compound with a dispersant substrate. The thiadiazole compound may be covalently bonded, salted, complexed or otherwise solubilised with a dispersant, or mixtures thereof.

The relative amounts of the dispersant substrate and the thiadiazole used to prepare the thiadiazole-functionalised dispersant may vary. In one embodiment the thiadiazole compound is present at 0.1 to 10 parts by weight relative to 100 parts by weight of the dispersant substrate. In different embodiments the thiadiazole compound is present at greater than 0.1 to 9, or greater than 0.1 to less than 5, or 0.2 to less than 5:to 100 parts by weight of the dispersant substrate. The relative amounts of the thiadiazole compound to the dispersant substrate may also be expressed as (0.1-10):100, or (>0.1-9):100, (such as (>0.5-9):100), or (0.1 to less than 5):100, or (0.2 to less than 5):100.

In one embodiment the dispersant substrate is present at 0.1 to 10 parts by weight relative to 1 part by weight of the thiadiazole compound. In different embodiments the dispersant substrate is present at greater than 0.1 to 9, or greater than 0.1 to less than 5, or about 0.2 to less than 5:to 1 part by weight of the thiadiazole compound. The relative amounts of the dispersant substrate to the thiadiazole compound may also be expressed as (0.1-10):1, or (>0.1-9):1, (such as (>0.5-9):1), or (0.1 to less than 5):1, or (0.2 to less than 5):1.

The thiadiazole-functionalised dispersant may be derived from a substrate that includes a succinimide dispersant (for example, N-substituted long chain alkenyl succinimides, typically a polyisobutylene succinimide), a Mannich dispersant, an ester-containing dispersant, a condensation product of a fatty hydrocarbyl monocarboxylic acylating agent with an amine or ammonia, an alkyl amino phenol dispersant, a hydrocarbyl-amine dispersant, a polyether dispersant, a polyetheramine dispersant, a viscosity modifier containing dispersant functionality (for example polymeric viscosity index modifiers (VMs) containing dispersant functionality), or mixtures thereof. In one embodiment the dispersant substrate includes a succinimide dispersant, an ester-containing dispersant or a Mannich dispersant.

In one embodiment the extreme pressure agent includes a boron-containing compound. The boron-containing compound includes a borate ester (which in some embodiments may also be referred to as a borated epoxide), a borated alcohol, a borated dispersant, a borated phospholipid or mixtures thereof. In one embodiment the boron-containing compound may be a borate ester or a borated alcohol.

The borate ester may be prepared by the reaction of a boron compound and at least one compound selected from epoxy compounds, halohydrin compounds, epihalohydrin compounds, alcohols and mixtures thereof. The alcohols include dihydric alcohols, trihydric alcohols or higher alcohols, with the proviso for one embodiment that hydroxyl groups are on adjacent carbon atoms, i.e., vicinal.

Boron compounds suitable for preparing the borate ester include the various forms selected from the group consisting of boric acid (including metaboric acid, orthoboric acid and tetraboric acid), boric oxide, boron trioxide and alkyl borates. The borate ester may also be prepared from boron halides.

In one embodiment suitable borate ester compounds include tripropyl borate, tributyl borate, tripentyl borate, trihexyl borate, triheptyl borate, trioctyl borate, trinonyl borate and tridecyl borate. In one embodiment the borate ester compounds include tributyl borate, tri-2-ethylhexyl borate or mixtures thereof.

In one embodiment, the boron-containing compound is a borated dispersant, typically derived from an N-substituted long chain alkenyl succinimide. In one embodiment the borated dispersant includes a polyisobutylene succinimide. Borated dispersants are described in more detail in U.S. Pat. Nos. 3,087,936; and 3,254,025.

In one embodiment the borated dispersant may be used m combination with a sulfur-containing compound or a borate ester.

In one embodiment the extreme pressure agent is other than a borated dispersant.

The number average molecular weight of the hydrocarbon from which the long chain alkenyl group was derived includes ranges of 350 to 5000, or 500 to 3000, or 550 to 1500. The long chain alkenyl group may have a number average molecular weight of 550, or 750, or 950 to 1000.

The N-substituted long chain alkenyl succinimides are borated using a variety of agents including boric acid (for example, metaboric acid, orthoboric acid and tetraboric acid), boric oxide, boron trioxide, and alkyl borates. In one embodiment the borating agent is boric acid which may be used alone or in combination with other borating agents.

The borated dispersant may be prepared by blending the boron compound and the N-substituted long chain alkenyl succinimides and heating them at a suitable temperature, such as, 80° C. to 250° C., or 90° C. to 230° C., or 100° C. to 210° C., until the desired reaction has occurred. The molar ratio of the boron compounds to the N-substituted long chain alkenyl succinimides may have ranges including 10:1 to 1:4, or 4:1 to 1:3; or the molar ratio of the boron compounds to the N-substituted long chain alkenyl succinimides may be 1:2. Alternatively, the ratio of moles B:moles N (that is, atoms of B:atoms of N) in the borated dispersant may be 0.25:1 to 10:1 or 0.33:1 to 4:1 or 0.2:1 to 1.5:1, or 0.25:1 to 1.3:1 or 0.8:1 to 1.2:1 or about 0.5:1 An inert liquid may be used in performing the reaction. The liquid may include toluene, xylene, chlorobenzene, dimethylformamide or mixtures thereof.

In one embodiment the lubricating oil composition further includes a borated phospholipid. The borated phospholipid may be derived from boronation of a phospholipid (for example boronation may be carried out with boric acid). Phospholipids and lecithins are described in detail in Encyclopedia of Chemical Technology, Kirk and Othmer, 3rd Edition, in "Fats and Fatty Oils", Volume 9, pages 795-831 and in "Lecithins", Volume 14, pages 250-269.

The phospholipid may be any lipid containing a phosphoric acid, such as lecithin or cephalin, or derivatives thereof. Examples of phospholipids include phosphatidylcholine, phosphatidylserine, phosphatidylinositol, phosphatidylethanolamine, phosphotidic acid and mixtures thereof. The phospholipids may be glycerophospholipids, glycerol derivatives of the above list of phospholipids. Typically, the glycerophospholipids have one or two acyl, alkyl or alkenyl groups on a glycerol residue. The alkyl or alkenyl groups may contain 8 to 30, or 8 to 25, or 12 to 24 carbon atoms. Examples of suitable alkyl or alkenyl groups include octyl, dodecyl, hexadecyl, octadecyl, docosanyl, octenyl, dodecenyl, hexadecenyl and octadecenyl.

Phospholipids may be prepared synthetically or derived from natural sources. Synthetic phospholipids may be prepared by methods known to those in the art. Naturally derived phospholipids are often extracted by procedures known to those in the art. Phospholipids may be derived from animal or vegetable sources. A useful phospholipid is derived from sunflower seeds. The phospholipid typically contains 35% to 60% phosphatidylcholine, 20% to 35% phosphatidylinositol, 1% to 25% phosphatidic acid, and 10% to 25% phosphatidylethanolamine, wherein the percentages are by weight based on the total phospholipids. The fatty acid content may be 20% by weight to 30% by weight palmitic acid, 2% by weight to 10% by weight stearic acid, 15% by weight to 25% by weight oleic acid, and 40% by weight to 55% by weight linoleic acid.

In another embodiment, the lubricating oil composition contains a friction modifier. A friction modifier is any material or materials that can alter the coefficient of friction of a surface lubricated by any lubricant or fluid containing such material(s). Friction modifiers, also known as friction reducers, or lubricity agents or oiliness agents, and other such agents that change the ability of base oils, formulated lubricant compositions, or functional fluids, to modify the coefficient of friction of a lubricated surface may be effectively used in combination with the base oils or lubricant compositions of the present invention if desired. Friction modifiers may include metal-containing compounds or materials as well as ashless compounds or materials, or mixtures thereof. Metal-containing friction modifiers may include metal salts or metal-ligand complexes where the metals may include alkali, alkaline earth, or transition group metals. Such metal-containing friction modifiers may also have low-ash characteristics. Transition metals may include Mo, Sb, Sn, Fe, Cu, Zn, and others. Ligands may include hydrocarbyl derivative of alcohols, polyols, glycerols, partial ester glycerols, thiols, carboxylates, carbamates, thiocarbamates, dithiocarbamates, phosphates, thiophosphates, dithiophosphates, amides, imides, amines, thiazoles, thiadiazoles, dithiazoles, diazoles, triazoles, and other polar molecular functional groups containing effective amounts of O, N, S, or P, individually or in combination. In particular, Mo-containing compounds can be particularly effective such as for example Mo-dithiocarbamates, Mo(DTC), Mo-dithiophosphates, Mo(DTP), Mo-amines, Mo (Am), Mo-alcoholates, Mo-alcohol-amides, etc.

Ashless friction modifiers may have also include lubricant materials that contain effective amounts of polar groups, for example, hydroxyl-containing hydrocarbyl base oils, glycerides, partial glycerides, glyceride derivatives, and the like. Polar groups in friction modifiers may include hydrocarbyl groups containing effective amounts of O, N, S, or P, individually or in combination. Other friction modifiers that may be particularly effective include, for example, salts (both ash-containing and ashless derivatives) of fatty acids, fatty alcohols, fatty amides, fatty esters, hydroxyl-containing carboxylates, and comparable synthetic long-chain hydrocarbyl acids, alcohols, amides, esters, hydroxy carboxylates, and the like. In some instances fatty organic acids, fatty amines, and sulfurized fatty acids may be used as suitable friction modifiers.

In one embodiment the lubricating oil composition may contain phosphorus- or sulfur-containing antiwear agents other than compounds described as an extreme pressure agent of the amine salt of a phosphoric acid ester described above. Examples of the antiwear agent may include a non-ionic phosphorus compound (typically compounds having phosphorus atoms with an oxidation state of +3 or +5), a metal dialkyldithiophosphate (typically zinc dialkyldithiophosphates), amine dithiophosphate, ashless dithiophosphates and a metal mono- or di-alkylphosphate (typically zinc phosphates), or mixtures thereof.

The non-ionic phosphorus compound includes a phosphite ester, a phosphate ester, or mixtures thereof.

In one embodiment the lubricating oil composition of the invention further includes at least one antioxidant. Antioxidants retard the oxidative degradation of base stocks during service. Such degradation may result in deposits on metal surfaces, the presence of sludge, or a viscosity increase in the lubricant. One skilled in the art knows a wide variety of oxidation inhibitors that are useful in lubricating oil compositions.

Useful antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_{6+}$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic propionic ester derivatives. Bis-phenolic antioxidants may also be advantageously used in combination with the instant invention. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic monoamines of the formula $R^8R^9R^{10}N$, where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$, where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to about 20 carbon atoms, and preferably contains from about 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present invention include: p,p'-dioctyldiphenylamine; t-octylphenyl-alpha-naphthylamine; phenyl-alphanaphthylamine; and p-octyl-phenyl-alpha-naphthylamine.

Sulfurized alkyl phenols and alkali or alkaline earth metal salts thereof also are useful antioxidants.

In one embodiment the lubricating oil composition of the invention further includes a dispersant. The dispersant may be a succinimide dispersant (for example N-substituted long chain alkenyl succinimides), a Mannich dispersant, an ester-containing dispersant, a condensation product of a fatty hydrocarbyl monocarboxylic acylating agent with an amine or ammonia, an alkyl amino phenol dispersant, a hydrocarbyl-amine dispersant, a polyether dispersant or a polyether-amine dispersant.

In one embodiment the succinimide dispersant includes a polyisobutylene-substituted succinimide, wherein the polyisobutylene from which the dispersant is derived may have a number average molecular weight of 400 to 5000, or 950 to 1600.

Succinimide dispersants and their methods of preparation are more fully described in U.S. Pat. Nos. 4,234,435 and 3,172,892.

Suitable ester-containing dispersants are typically high molecular weight esters. These materials are described in more detail in U.S. Pat. No. 3,381,022.

In one embodiment the dispersant includes a borated dispersant. Typically the borated dispersant includes a succinimide dispersant including a polyisobutylene succinimide, wherein the polyisobutylene from which the dispersant is derived may have a number average molecular weight of 400 to 5000. Borated dispersants are described in more detail above within the extreme pressure agent description.

Dispersant viscosity modifiers (often referred to as DVMs) include functionalised polyolefins, for example, ethylene-propylene copolymers that have been functionalized with the reaction product of maleic anhydride and an amine, a polymethacrylate functionalised with an amine, or esterified styrene-maleic anhydride copolymers reacted with an amine may also be used in the composition of the invention.

Corrosion inhibitors which are necessary components of the present invention can be described as any materials (additives, functionalized fluids, etc.) that form a protective film on a surface that prevents corrosion agents from reacting or attacking that surface with a resulting loss of surface material. Protective films may be absorbed on the surface or chemically bonded to the surface. Protective films may be constituted from mono-molecular species, oligomeric species, polymeric species, or mixtures thereof. Protective films may derive from the intact corrosion inhibitors, from their combination products, or their degradation products, or mixtures thereof. Surfaces that may benefit from the action of corrosion inhibitors may include metals and their alloys (both ferrous and non-ferrous types) and non-metals.

Corrosion inhibitors may include various oxygen-, nitrogen-, sulfur-, and phosphorus-containing materials, and may include metal-containing compounds (salts, organometallics, etc.) and nonmetal-containing or ashless materials. Corrosion inhibitors may include, but are not limited to, additive types such as, for example, hydrocarbyl-, aryl-, alkyl-, arylalkyl-, and alkylaryl-versions of detergents (neutral, overbased), sulfonates, phenates, salicylates, alcoholates, carboxylates, salixarates, phosphites, phosphates, thiophosphates, amines, amine salts, amine phosphoric acid salts, amine sulfonic acid salts, alkoxylated amines, etheramines, polyetheramines, amides, imides, azoles, diazoles, triazoles, benzotriazoles, benzothiadoles, mercaptobenzothiazoles, tolyltriazoles (TTZ-type), heterocyclic amines, heterocyclic sulfides, thiazoles, thiadiazoles, mercaptothiadiazoles, dimercaptothiadiazoles (DMTD-type), imidazoles, benzimidazoles, dithiobenzimidazoles, imidazolines, oxazolines, Mannich reactions products, glycidyl ethers, anhydrides, carbamates, thiocarbamates, dithiocarbamates, polyglycols, etc., or mixtures thereof.

Corrosion inhibitors are used to reduce the degradation of metallic parts that are in contact with the lubricating oil composition. Suitable corrosion inhibitors include thiadiazoles. Aromatic triazoles, such as tolyltriazole, are suitable corrosion inhibitors for non-ferrous metals, such as copper.

Metal deactivators include derivatives of benzotriazoles (typically tolyltriazole), 1,2,4-triazoles, benzimidazoles, 2-alkyldithiobenzimidazoles, thiadiazoles or 2-alkyldithiobenzothiazoles.

Foam inhibitors may advantageously be added to the lubricating oil composition. These agents retard the formation of stable foams. Silicones and organic polymers are typical foam inhibitors. For example, polysiloxanes, such as silicon oil, or polydimethylsiloxane, provide foam inhibiting properties. Further foam inhibitors include copolymers of ethyl acrylate and 2-ethylhexyl acrylate and optionally vinyl acetate.

Demulsifiers include trialkyl phosphates, and various polymers and copolymers of ethylene glycol, ethylene oxide, propylene oxide, or mixtures thereof.

Pour point depressants including esters of maleic anhydride-styrene, polymethacrylates, polyacrylates or polyacrylamides.

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride. Such additives may preferably be used in an amount of 0.01 to 3% by weight, more preferably 0.01 to 2% by weight.

The lubricating oil compositions comprising at least one inventively claimed polyester as defined above can be used for various applications such as light, medium and heavy duty engine oils, industrial engine oils, marine engine oils, automotive engine oils, crankshaft oils, compressor oils, refrigerator oils, hydrocarbon compressor oils, very low-temperature lubricating oils and fats, high temperature lubricating oils and fats, wire rope lubricants, textile machine oils, refrigerator oils, aviation and aerospace lubricants, aviation turbine oils, transmission oils, gas turbine oils, spindle oils, spin oils, traction fluids, transmission oils, plastic transmission oils, passenger car transmission oils, truck transmission oils, industrial transmission oils, industrial gear oils, insulating oils, instrument oils, brake fluids, transmission liquids, shock absorber oils, heat distribution medium oils, transformer oils, fats, chain oils, minimum quantity lubricants for metalworking operations, oil to the warm and cold working, oil for water-based metalworking liquids, oil for neat oil metalworking fluids, oil for semi-synthetic metalworking fluids, oil for synthetic metalworking fluids, drilling detergents for the soil exploration, hydraulic oils, in biodegradable lubricants or lubricating greases or waxes, chain saw oils, release agents, moulding fluids, gun, pistol and rifle lubricants or watch lubricants and food grade approved lubricants.

Preferably the lubricating oil composition is in contact with at least one metal selected from the group consisting of iron, copper, aluminum, magnesium, zinc, cadmium, lead, cobalt and tin, more preferably with copper and/or iron, most preferably with copper. The aforementioned metals may also be present in the form of mixtures containing one or more of the aforementioned metals, i.e. the aforementioned metals can also be present in the form of their alloys.

In another embodiment, the presently claimed invention is directed to a method for reducing the friction coefficient of a lubricating oil composition in the lubrication of a mechanical device comprising formulating said lubricating oil composition with at least one polyester as defined above.

The friction-modification properties are determined by measuring the friction coefficient at 0-25% slide roll ratio (SRR), mean speed of 4 m/s, using mini-traction machine (MTM) measurements at 70° C. and 1 GPa loading. Reducing the friction coefficient means in the sense of the presently claimed invention that the friction coefficient of a lubricating oil composition comprising a carboxylic acid ester as defined above is lower than the friction coefficient of a lubricating oil composition that does not contain said carboxylic acid ester.

A mechanical device in the sense of the presently claimed invention is a mechanism consisting of a device that works on mechanical principles.

EXAMPLES

General Procedure for the Synthesis of Polyester

A one-liter three necked flask was filled with component a) [adipic acid, 146 g=34.44% by weight], component b) [2-propylheptanol, 256.75 g=60.18% by weight] and component c) [trimethylolpropane, 21.22 g=5.00% by weight].

Stannous oxalate [Fascat® 2001, obtainable from Arkema Inc., USA, 0.28% by weight] and hypophosphorous acid [50% solution in water, 0.10% by weight] were added.

Nitrogen was bubbled through the mixture and the mixture was heated to 140° C. for a period of 3 hours while stirring. Then the mixture was heated to 200° C. for a period of 5 hours. A vacuum was gradually applied. When an acid value <0.2 was reached, the remaining alcohol was distilled of by applying a vacuum at 230° C. The mixture was cooled to 90° C. and water was added. The liquid reaction mixture was dried by applying a vacuum at 130° C. and filtered.

Composition of the polyester according to the presently claimed invention

TABLE 1

|  | Example 1 % by weight | Example 2 % by weight | Example 3 % by weight |
| --- | --- | --- | --- |
| dipentaerythritol (component c) | 0.92 | 1.89 | 3.99 |
| 2-propylheptanol (component b) | 67.30 | 65.51 | 61.64 |
| adipic acid (component a) | 31.78 | 32.60 | 34.37 |

|  | Example 4 % by weight | Example 5 % by weight | Example 6 % by weight |
| --- | --- | --- | --- |
| trimethylolpropane (component c) | 11.07 | 5.48 | 13.91 |
| 2-propylheptanol (component b) | 58.76 | 64.65 | 44.74 |
| adipic acid (component a) | 30.17 | 29.87 | 41.34 |

|  | Example 7 % by weight |
| --- | --- |
| trimethylolpropane (component c) | 2.73 |
| 2-propylheptanol (component b) | 67.55 |
| adipic acid (component a) | 29.72 |

2-propylheptanol is commercially available from BASF SE, Ludwigshafen. [93.0% by weight 2-propyl-heptanol; 2.9% by weight 2-propyl-4-methyl-hexanol; 3.9% by weight 2-propyl-5-methylhexanol and 0.2% by weight 2-isopropylheptanol]

Trimethylolpropane is commercially available from BASF SE

Adipic acid is commercially available from BASF SE

TABLE 2

|  | Ex. 1 | Ex. 2 | Ex. 3 | Ex. 4 | Ex. 5 | Ex. 6 | Ex. 7 |
| --- | --- | --- | --- | --- | --- | --- | --- |
| acid value [mg KOH/g] DIN 51558 | 0.1 | 0.15 | 0.24 | 0.16 | 0.09 | 0.18 | 0.21 |
| hydroxyl number [mg KOH/g] DIN 53240 | 1.6 | 0.3 | 1.8 | nd | 2.6 | nd | nd |
| kinematic viscosity [mm$^2$/s] at 40° C. DIN 51562-1 | 13.71 | 17.23 | 28.6 | 52.36 | 36.85 | 366 | 25.5 |
| kinematic viscosity [mm$^2$/s] at 100° C. DIN 51562-1 | 3.36 | 4.07 | 5.97 | 8.2 | 6.92 | 44.74 | 5.14 |
| viscosity index ASTM D 2270 | 119 | 141 | 161 | 137 | 128 | 169 | 118 |
| density at 15° C. [g/cm$^3$] DIN 51757 | 0.921 | 0.929 | 0.944 | 0.971 | 0.955 | nd | nd |
| pour point [° C.] DIN ISO 3016 | −80 | −69 | −66 | −80 | −76 | −80 | −63 |
| cloud point [° C.] DIN ISO 3015 | −46 | −38 | −40 | −48 | −40 | −41 | −80 |

Friction Coefficient Evaluation

The samples were tested in the MTM (Mini-Traction Machine) instrument using the so-called traction test mode. In this mode, the friction coefficient is measured at a constant mean speed (4 m/s) over a range of slide roll ratios (SRR) to give the traction curve. SRR=sliding speed/mean entrainment speed=2 (U1−U2)/(U1+U2) in which U1 and U2 are the ball and disc speeds respectively The disc and ball used for the experiments were made of steel (AISI 52100), with a hardness of 750 HV and Ra<0.02 μm. The diameter was 45.0 mm and 19.0 mm for the disc and the ball respectively. The tractions curves were run with 1.00 GPa contact pressure, 4 m/s mean speed, at a temperature of 70° C. The slide-roll ratio (SRR) was varied from 0 to 25% and the friction coefficient measured. Each sample (20 ml) was run three times.

Results of the Evaluation

Figure 1:
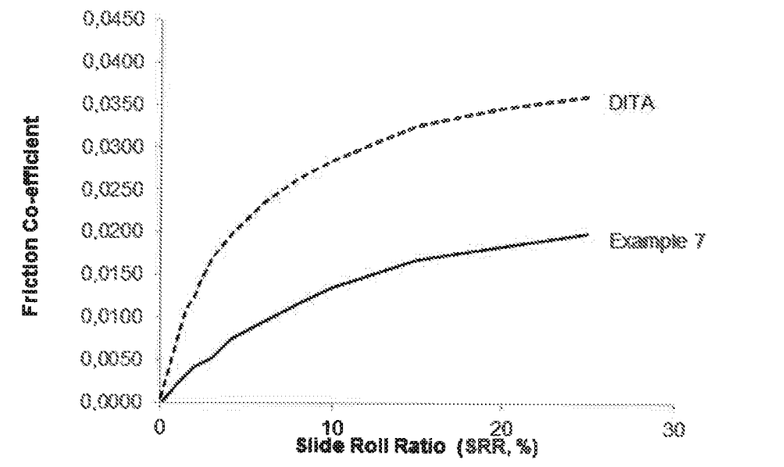
FIG. 1 illustrates the results of MTM testing. The upper curve is obtained from evaluation of DITA (diisotridecl adipate) and the lower curve is obtained from the evaluation of example 7.

The results of the MTM testing are shown in FIG. 1. The upper curve is obtained from evaluation of DITA (diisotridecyl adipate) and the lower curve is obtained from evaluation of example 7. The esters according to the presently claimed invention show a significantly lower coefficient of friction.

Determination of Hydrolytic Stability

The hydrolytic stability was determined by measuring the acid value during a 9-day reaction with water at 100° C. as described in "Svensk Standard S-155181".

TAN=total acid number in mg KOH/g, determined according to DIN 51558

Results of the Evaluation

After 200 hours DITA shows a total acid number of 6.1 mg KOH/g, whereas the sample according to example 7 only shows a total acid number of 1.1 mg KOH/g. The lower total acid number of the inventively claimed ester is indicating its higher hydrolytic stability in comparison to DITA.

The invention claimed is:

1. A polyester which is obtainable by reacting a mixture comprising
   a) at least one acid selected from the group consisting of aliphatic dicarboxylic acids having 5 to 20 carbon atoms and cycloaliphatic dicarboxylic acid having 4 to 36 carbon atoms, b) at least one monoalcohol of the formula I, $$H_3C-(CH_2)_p-\overset{H}{\underset{CH_2-(CH_2)_{(p+2)}}{C}}-CH_2-O-H,\quad\text{I}$$

wherein p is 2;
and
c) at least one polyol with a hydroxyl functional in the range of ≥2 to ≤6 and wherein
≥25 to ≤50% by weight of component a),
≥40 to ≤70% by weight of component b) and
≥0.1 to ≤20% by weight of component c),
whereby and the sum of the weight of all components a), b) and c) adds up to 100%.

2. The polyester according to claim 1, wherein the at least one aliphatic dicarboxylic acid having 5 to 20 carbon atoms is selected from the group consisting of
glutaric acid, azelaic acid, sebacic acid, adipic acid, pimelic acid, suberic acid, undecanedioic acid, dodecanedioic acid, brassylic acid, tetradecanedioic acid, pentadecanedioic acid, hexadecanedioic acid and octadecanedioic acid.

3. The polyester according to claim 1, wherein the at least one cycloaliphatic dicarboxylic acid having 4 to 36 carbon atoms is selected from the group consisting of
1,4-cyclohexanedicarboxylic acid, 2,6-decahydronaphthalenedicarboxylic acid, 1,3-cyclohexanedicarboxylic acid and 2,5-norbornanedicarboxylic acid.

4. The polyester according to claim 1, wherein the at least one polyol with a hydroxyl functionality in the range of ≥2 to ≤6 is selected from the group consisting of
ethylene glycol, diethylene glycol, triethylene glycol, 1,2-propylene glycol, dipropylene glycol, tripropylene glycol, 1,4-butanediol, 1,6-hexanediol, bisphenol A, trimethylolpropane, glycerol, castor oil, pentaerythritol, sorbitol, dipentaerythritol and sucrose.

5. The polyester according to claim 1, wherein the at least one polyol with a hydroxyl functionality in the range of ≥2 to ≤6 is selected from the group consisting of
ethylene glycol, diethylene glycol, triethylene glycol, 1,2-propylene glycol, dipropylene glycol, tripropylene glycol, 1,4-butanediol, 1,6-hexanediol, bisphenol A, trimethylolpropane glycerol, castor oil, pentaerythritol, sorbitol, dipentaerythritol and sucrose.

6. The polyester according to claim 5, wherein the at least one aliphatic dicarboxylic acid having 5 to 20 carbon atoms is selected from the group consisting of
glutaric acid, azelaic acid, sebacic acid, adipic acid, pimelic acid, suberic acid, undecanedioic acid, dodecanedioic acid, brassylic acid, tetradecanedioic acid, pentadecanedioic acid, hexadecanedioic acid and octadecanedioic acid.

7. The polyester according to claim 5, wherein the at least one cycloaliphatic dicarboxylic acid having 4 to 36 carbon atoms is selected from the group consisting of
1,4-cyclohexanedicarboxylic acid, 2,6-decahydronaphthalenedicarboxylic acid, 1,3-cyclohexanedicarboxylic acid and 2,5-norbornanedicarboxylic acid.

8. The polyester according to claim 1, wherein the polyester has a viscosity in the range from ≥10 to ≤500 mm²/s at 40° C. determined according to DIN 51562-1.

9. The polyester according to claim 1, wherein the polyester has a viscosity index in the range of ≥3 to ≤50 mm²/s at 100° C. determined according to DIN 51562-1.

10. The polyester according to claim 1, wherein the polyester has a viscosity index in the range of ≥110 to ≤190 determined according to ASTM D 2270.

11. The polyester according to claim 1, wherein the polyester has a density in the range from ≥0.91 to ≤1.10 g/cm³ at 15° C. determined according to DIN 51757.

12. A process for the preparation of the polyester according to claim 1 comprising the steps of
i) reacting a mixture comprising component a), component b) and component c), each case defined as in claim 1, in the presence of at least one catalyst selected from the group consisting of titanium-containing compounds, zirconium-containing compounds and tin-containing compounds,
ii) heating the mixture obtained according to step i) to a temperature in the range of 80° C. to 160° C. in a first step and subsequently to a temperature in the range of 190° C. to 240° C. in a second step,
iii) applying vacuum to the reaction mixture obtained according to step ii),
iv) cooling of the reaction mixture obtained according to step iii) to a temperature in the range of 20° C. to 90° C. and adding water to the reaction mixture and
v) drying and purification of the reaction mixture obtained according to step iv).

13. A lubricating oil composition comprising
a) ≥1% to ≤99.9% by weight of at least one polyester according to claim 1,
b) ≥0% to ≤99% by weight of at least one base stock selected from the group consisting of mineral oils (Group I, II or III oils), polyalphaolefins (Group IV oils), polymerized and interpolymerized olefins, alkyl naphthalenes, alkylene oxide polymers, silicone oils, phosphate esters and carboxylic acid esters (Group V oils),
and
c) ≥0.1 to ≤25 by weight of one or more performance additives, whereby the by weight of the components a), b) and c) is in each case related to the overall weight of the lubricating oil composition and the sum of the weight of all components a), b) and c) adds up to 100%.

14. A light, medium and heavy duty engine oil, industrial engine oil, marine engine oil, automotive engine oil, crankshaft oil, compressor oil, refrigerator oil, hydrocarbon compressor oil, very low-temperature lubricating oil and flits, high temperature lubricating oil and fats, wire rope lubricant, textile machine oil, refrigerator oil, aviation and aerospace lubricant, aviation turbine oil, transmission oil, gas turbine oil, spindle oil, spin oil, traction fluid, transmission oil, plastic transmission oil, passenger car transmission oil, truck transmission oil, industrial transmission oil, industrial gear oil, insulating oil, instrument oil, brake fluid, transmission liquid, shock absorber oil, heat distribution medium oil, transformer oil, flit, chain oil, minimum quantity lubricant for metalworking operations, oil to the warm and cold working, oil for water-based metalworking liquid, oil for neat oil metalworking fluid, oil for semi-synthetic metalworking fluids, oil for synthetic metalworking fluids, drilling detergent for the soil exploration, hydraulic oil, in a biodegradable lubricant or lubricating grease or wax, chain saw oil, release agent, moulding fluid, gun, pistol and rifle lubricant or watch lubricant or food grade approved lubricant which comprises the lubricating composition according to claim 13.

15. A method for reducing the friction coefficient of a lubricating oil composition
   in the lubrication of a mechanical device comprising formulating said lubricating oil composition with at least one polyester according to claim 1.

16. The method according to claim 15, wherein the friction coefficient is measured at 0-25% slide roll ratio (SRR), mean speed 4mm/s, using mini-traction machine (MTM) measurements at 70° C. and 1GPa loading.

17. The polyester according to claim 1, wherein said at least one acid is at least one cycloaliphatic dicarboxylic acid having 4 to 36 carbon atoms and is selected from the group consisting of
   1,4-cyclohexanedicarboxylic acid, 2,6-decahydronaphthalenedicarboxylic acid, 1,3-cyclohexanedicarboxylic acid and 2,5-norbarnanedicarboxylic acid.

* * * * *